(12) United States Patent
Kestenbaum et al.

(10) Patent No.: US 7,148,414 B2
(45) Date of Patent: Dec. 12, 2006

(54) COLORED MUSIC NOTATION SYSTEM AND METHOD OF COLORIZING MUSIC NOTATION

(75) Inventors: David Kestenbaum, 52 Sultana Avenue, Toronto, Ontario (CA) M6A 1T1; Victor Mair Hyman, Toronto (CA)

(73) Assignee: David Kestenbaum, Toronto (CA)

( * ) Notice: Subject to any disclaimer, the term of this patent is extended or adjusted under 35 U.S.C. 154(b) by 0 days.

(21) Appl. No.: 10/463,550

(22) Filed: Jun. 18, 2003

(65) Prior Publication Data

US 2004/0255755 A1 Dec. 23, 2004

(30) Foreign Application Priority Data

Apr. 11, 2003 (CA) .................................... 2425965

(51) Int. Cl.
*G09B 15/02* (2006.01)
(52) U.S. Cl. .................................... 84/483.2; 84/477 R
(58) Field of Classification Search ............... 84/483.2, 84/483.1, 477 R, 478, 470 R
See application file for complete search history.

(56) References Cited

U.S. PATENT DOCUMENTS

| | | | |
|---|---|---|---|
| 1,805,488 A | | 5/1931 | Jolls |
| 3,680,428 A | * | 8/1972 | Buckrucker et al. ...... 84/471 R |
| 4,114,501 A | | 9/1978 | Tanaka |
| 4,961,362 A | | 10/1990 | Gunn |
| 5,253,078 A | * | 10/1993 | Balkanski et al. .......... 382/250 |
| 5,309,812 A | | 5/1994 | Shelton |
| 5,540,132 A | | 7/1996 | Hale |
| 5,775,915 A | | 7/1998 | Quinn |
| 5,920,023 A | | 7/1999 | Ravagni et al. |
| 5,998,720 A | | 12/1999 | Beatty |
| 6,057,501 A | | 5/2000 | Hale |
| 6,124,540 A | | 9/2000 | Lotito |
| 6,218,603 B1 | | 4/2001 | Coonce |
| 6,284,961 B1 | * | 9/2001 | Kimmel, Jr. ................. 84/478 |
| 6,288,315 B1 | | 9/2001 | Bennett |
| 6,313,385 B1 | | 11/2001 | Beatty |
| 6,337,434 B1 | | 1/2002 | Oren-Chazon |
| 6,987,220 B1 | * | 1/2006 | Holcombe ................. 84/483.2 |

(Continued)

FOREIGN PATENT DOCUMENTS

CA 354201 11/1935

(Continued)

*Primary Examiner*—Lincoln Donovan
*Assistant Examiner*—Jianchun Qin
(74) *Attorney, Agent, or Firm*—Dimock Stratton LLP; Mark B. Eisen

(57) ABSTRACT

A colored music notation system and a method of colorizing music notation using seven colors that are easily distinguishable from one another, representing the seven unique notes in an octave. The color of a note may be chosen from a list of colors in CMYK format, with a tolerance of plus or minus ten points, preferably plus or minus five points in attributes for any of the colors. The colors may be reproduced by any printing method, including using a conventional personal computer. The colors are easily reproducible within acceptable tolerances on a wide variety of media and with a range of printing options, can be read under various lighting conditions, and do not make written music unpleasant to the eye. The colors are also sufficiently different to allow for easy recognition of common chord combinations by the recollection of simple groups of colors. In the preferred embodiment of the invention, notes affected by an accidental are the same color as the natural note to which they are related. The invention also provides a method for applying color to the keys a keyboard instrument.

21 Claims, 2 Drawing Sheets

U.S. PATENT DOCUMENTS

| | | |
|---|---|---|
| 2001/0039869 A1 | 11/2001 | Oren-Chazon |
| 2002/0011142 A1 | 1/2002 | Mead |
| 2002/0050206 A1 | 5/2002 | MacCutcheon |
| 2002/0096037 A1 | 7/2002 | Muller |

FOREIGN PATENT DOCUMENTS

| | | |
|---|---|---|
| CA | 725870 | 1/1966 |
| CA | 956106 | 10/1974 |
| CA | 1023550 | 1/1978 |
| CA | 1120708 | 3/1982 |
| CA | 1221256 | 5/1987 |
| CA | 1234485 | 3/1988 |
| CA | 1269242 | 5/1990 |
| CA | 2062634 A1 | 9/1992 |
| CA | 2137908 A1 | 12/1993 |
| WO | WO01/78058 * | 10/2001 |
| WO | WO01/78058 A2 | 10/2001 |
| WO | WO 01/78058 A2 | 10/2001 |

* cited by examiner

COLORED MUSIC NOTATION SYSTEM AND METHOD OF COLORIZING MUSIC NOTATION

FIELD OF INVENTION

This invention relates to music notation. In particular, this invention relates to a colored music notation system and a method of colorizing music notation.

BACKGROUND OF THE INVENTION

Standard Music Notation (SMN) is a method of writing what is commonly known as "Sheet Music" or "Musical Scores," to graphically represent a piece of music in a form that is familiar to and understood by musicians. SMN is a system that has developed and evolved over the course of several hundred years, and is almost universally accepted as the standard method for representing music graphically.

Standard music notation involves the positioning of note characters on one or more staves or staffs. Each staff consists of five lines and four spaces, each of which represents a particular musical tone. The sequential lines and spaces represent sequential tones, and the note characters differ according to the duration of the note. While there are relatively few note characters, so it is not particularly difficult to learn the length (i.e. number of beats or fraction thereof) of each note, there are many different tones, 12 in each octave, extending over many octaves. Moreover, as between the two standard staffs—the treble staff and the bass staff—corresponding tone occupy different positions on the staffs. It is accordingly considerably more difficult for most people to learn to mentally translate the position of each note character to the position that will generate the indicated tone on a musical instrument (e.g. the correct key on a piano, the correct string and fret on a guitar, etc.). This is especially problematic during a fast musical passage, where the mind has little time to process the position of the note character and translate it to the corresponding tone on the instrument.

Thus, for most people the only difficult aspect of learning to read SMN is being able to determine in an instant what tone is being represented by a note on the staff. There have been many attempts over the years to modify or replace SMN because of the general level of difficulty that most people seem to have learning this system. Most of the new methods proposed require a total change in how the music is annotated, and therefore such methods have never been successfully implemented because musicians who have taken the time to learn SMN to the point of proficiency will resist switching to an entirely or substantially new system.

Some proposed methods require less adaptation, using color as an additional indicator of tone. For example, U.S. Pat. No. 6,284,961 issued Sep. 4, 2001 to Richard C. Kimmel, Jr., which is incorporated herein by reference, teaches the use of a color for each of the 12 tones in an octave, while others published U.S. patent application Ser. No. 2002/0050206 published May 2, 2002 by Jane S. MacCutcheon, which is incorporated herein by reference, teaches the use of seven colors to represent the seven natural notes (A, B, C, D, E, F, and G) in an octave and a combination of colors to represent notes affected by accidentals (sharps and flats, which respectively raise and lower the affected natural note by one semi-tone).

These systems utilize too many colors and combinations of colors for most people to recall in the short time span available between notes in a musical composition. It is believed that most number of units in a set that is easily recallable for a majority of people is seven. However, some proposed seven color systems also increase complexity in an attempt to aid in the memorization of the note color combination. For example, U.S. patent application Ser. No. 2002/0050206 uses unintuitive color names (amethyst for purple, carrot for orange, diamond for gray, electric for yellow, flame for red) so that the first letter in the name of the color corresponds to the note that the color represents. This further limits the system to the English language; if it were desirable to translate this system for use in another language, say French or German (or even more cumbersome, Greek, Hebrew or Russian), new color names would have to be used in each language, thus precluding universality of the system.

Moreover, all of these systems add multiple changes to SMN that clutter the staff, and/or introduce unorthodox changes that deviate too substantially from the conventional music notation system and thus will not be accepted by mainstream users of written music.

SUMMARY OF THE INVENTION

The present invention addresses these disadvantage by providing a colored music notation system and a method of colorizing music notation using seven colors that are easily distinguishable from one another, representing the seven notes (A, B, C, D, E, F, and G) in an octave.

According to the present invention, the color of a note may be chosen from the following list of colors, in CMYK format, preferably with a tolerance of plus or minus five points in any or all of the C, M, Y or K attributes for any of the colors:

Color 1=0.100.0.0
Color 2=0.52.100.35
Color 3=0.0.0.100
Color 4=13.39.0.0
Color 5=60.0.100.0
Color 6=44.95.0.0
Color 7=100.0.0.0

These colors may be reproduced either by use of offset printing or by printing using an ink-jet, laser-jet, laser, or any other printing method via a conventional personal computer (PC), and through representation in any visual medium, whether analog or digital, in CMYK format or in an RGB or HEX equivalent or any other format that has the appearance of any of the listed colors (within the indicated tolerances).

The colors used in the present invention are easily reproducible within acceptable tolerances on a wide variety of media and with a range of printing options, allowing portability from professional printing systems to low cost home printers. The selected colors can be read under various lighting conditions, and do not make written music unpleasant to the eye.

The colors are also sufficiently different to allow for easy recognition of common chord combinations by the recollection of simple groups of colors. In the preferred embodiment of the invention, notes affected by an accidental are the same color as the natural note to which they are related. Preferably the accidental symbol itself is black, except for accidental symbols of the key signature which are colored according to the color of the natural note that they affect.

The invention also provides a method for applying color to the keys of piano and electronic keyboards by means of an adhesive label, for example an electrostatic label or a paper or plastic sticker, colored according to the color list.

Alternatively, a piano or other keyboard instrument may have color directly applied to the keys, either by the manufacturer or by the user.

The present invention thus provides a method of colorizing music notation, comprising the steps of: a. Scanning a printed black and white musical score; b. Saving the scanned file; c. Assigning colors to the scanned score to generate a colorized score, the colors being selected from a list comprising, in CMYK standard format, and with a tolerance of plus or minus ten points in one or more of the C, M, Y or K attributes:

Color 1=0.100.0.0
Color 2=0.52.100.35
Color 3=0.0.0.100
Color 4=13.39.0.0
Color 5=60.0.100.0
Color 6=44.95.0.0
Color 7=100.0.0.0; and d. Outputting the colorized score to a printer or memory device.

The present invention further provides a method of colorizing music notation, comprising the steps of: a. generating a Musical Instrument Digital Interface (MIDI) file; b. inputting the MIDI file into a music notation editing program, and if necessary correcting any errors introduced in saving, reading and/or converting the source file; c. assigning colors to the scanned score to generate a colorized score, the colors being selected from a list comprising, in CMYK standard format, and with a tolerance of plus or minus ten points in one or more of the C, M, Y or K attributes:

Color 1=0.100.0.0
Color 2=0.52.100.35
Color 3=0.0.0.100
Color 4 13.39.0.0
Color 5=60.0.100.0
Color 6=44.95.0.0
Color 7=100.0.0.0; and d. outputting the colorized score to a printer or memory device.

The present invention further provides a method of colorizing music notation, comprising the steps of: a. inputting data into a music notation editing program, the data corresponding to musical notes, to generate a musical score; b. if necessary correcting any errors introduced in saving, reading and/or converting the data; c. assigning colors to the notes and to key signature accidental symbols in the score to generate a colorized score, the colors of the key signature accidental symbols being the same as the colors assigned to the corresponding notes; and d. outputting the colorized score to a printer or memory device.

In a further aspect the method of the invention includes, before step d., the additional step of exporting the image of the colorized score to a graphics program for editing.

The invention further provides a colorized music score comprising notes representing musical tones, each note being colored, the note colors being selected from a list comprising, in CMYK standard format, and with a tolerance of plus or minus ten points in one or more of the C, M, Y or K attributes:

Color 1=0.100.0.0
Color 2=0.52.100.35
Color 3=0.0.0.100
Color 4=13.39.0.0
Color 5=60.0.100.0
Color 6=44.95.0.0
Color 7=100.0.0.0.

In a further aspect of the invention, music is entered in to a specialized notation program that automatically colorizes the score in real-time. Music notes may be entered via a normal computer keyboard that has notes mapped to the computer keyboards alpha/numeric keys or via a midi keyboard or by any other device that serves the purpose of inputting data to a computer.

BRIEF DESCRIPTION OF THE DRAWINGS

In drawings which illustrate by way of example only a preferred embodiment of the invention.

DETAILED DESCRIPTION OF THE INVENTION

Figure 1:
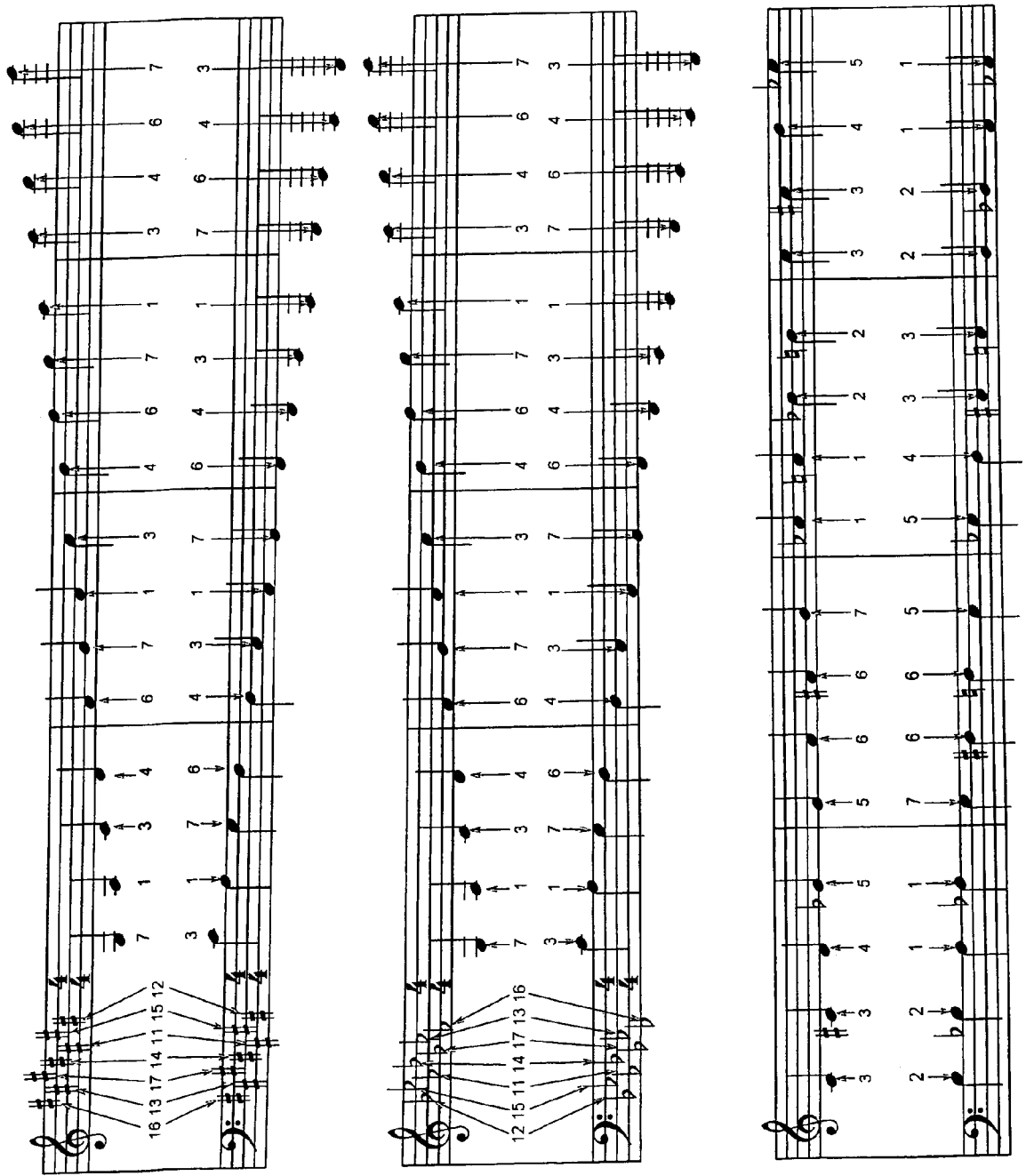
FIG. 1 is a graphical representation of a colorized musical score generated according to the method of the invention.
Figure 2:
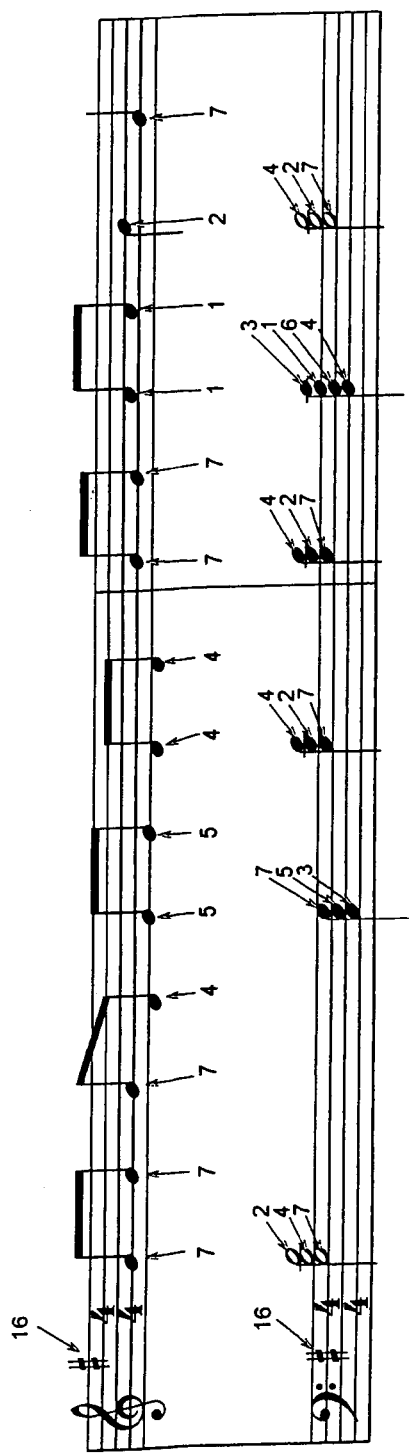
FIG. 2 is a graphical representation of a colorized musical score according to the method of the invention showing common color combinations.

FIG. 1 illustrates a colorized musical score generated according to the method of the invention. The colors for the natural notes are selected from the list of colors reproduced in Table 1 below, in CMYK standard format, with a tolerance of plus or minus ten points, and preferably with a tolerance of plus or minus five points in any or all of the C, M, Y or K attributes for any of the colors. The colors are identified in FIGS. 1 and 2 by the color number given in Table 1:

TABLE 1

| Color | CMYK Definition | Corresponding Natural Note |
|---|---|---|
| Color 1 | 0.100.0.0 | A |
| Color 2 | 0.52.100.35 | B |
| Color 3 | 0.0.0.100 | C |
| Color 4 | 13.39.0.0 | D |
| Color 5 | 60.0.100.0 | E |
| Color 6 | 44.95.0.0 | F |
| Color 7 | 100.0.0.0 | G |

It will be appreciated that the any of the listed colors could be assigned to the various natural tones in an octave in any combination, as long as each tone is represented by a single color, and FIG. 1 shows merely one example. However, the example of FIG. 1 is preferred because it maximizes easy recognition of common chord combinations, such as those illustrated in FIG. 2, by the recollection of simple groups of colors. As an example, the notes C, E and G, which represent a C major chord, will tend to appear more frequently than, for example, the notes C, D and G, which represents a C major chord with a suspended 2nd and is a less common chord. Thus, it is more advantageous to select between colors having a greater similarity for the notes C, E and G, because this combination of colors is more pleasant to the eye than others and will tend to appear more often in a musical score.

Thus, in sheet music produced according to the preferred embodiments of the invention chords are 'code' with a unique color combination, for example, a C major chord will always contain note color nos. 3, 5 and 7, and no other chord will have only those colors. This allows for instant recognition and identification of a chord, even when it is inverted, i.e. when the root note is not at the bottom of the chord.

In the preferred embodiment of the invention, notes affected by an accidental are the same color as the natural note to which they are related. Thus, as shown in FIG. 1, the A# note is assigned the same color as the natural A note (color 1 in the example illustrated), although preferably sharp and flat accidental symbols themselves are black.

Accidental symbols in the key signature, which affect all notes on the staff, are preferably colored, according to the color or the natural note that they affect. For example, in FIG. 2 the numbers of the key signature accidental symbols correspond to the notes and note nunbers shown in Table 2:

TABLE 2

| Symbol No. | Corresponding Note | Corresponding Note No. |
|---|---|---|
| 11 | A | 1 |
| 12 | B | 2 |
| 13 | C | 3 |
| 14 | D | 4 |
| 15 | E | 5 |
| 16 | F | 6 |
| 17 | G | 7 |

Thus, in one preferred embodiment the method of the invention comprises the steps of:

a. Scanning a printed black and white score. This can be done using any suitable Music Optical Character Recognition (MOCR) program, making any corrections necessary to ensure that the scanned score is identical to the original score;

b. Saving the scanned file in a suitable format, for example .nif, and open the file in a music notation editing program;

c. Assigning colors to the scanned score to generate a colorized score. This is preferably done automatically by the music notation editing program, based on programming the above color list into the program in a lookup table or through any other means which associates the selected color with the corresponding natural note. Manual verification and correction may be necessary, due to any inconsistencies in saving, reading and/or converting the source file; and d. Outputting the colorized score to a printer, or to a memory device in any suitable format, to generate a stored copy of the colorized score.

In a further preferred embodiment the method of the invention comprises the steps of:

a. generating a Musical Instrument Digital Interface (MIDI) file. This can be achieved using any MIDI-equipped musical instrument, whether a keyboard instrument or otherwise;

b. Inputting the MIDI file into a music notation editing program;

c. Assigning colors to the scanned score to generate a colorized score, the colors being selected from a list comprising, in CMYK standard format, and with a tolerance of plus or minus ten points in one or more of the C, M, Y or K attributes:

Color 1=0.100.0.0
Color 2=0.52.100.35
Color 3=0.0.0.100
Color 4=13.39.0.0
Color 5=60.0.100.0
Color 6=44.95.0.0
Color 7=100.0.0.0; and d. Outputting the colorized score to a printer or memory device.

In a further aspect the method of the invention includes, before step d., the additional step of exporting the image of the colorized score to a graphics program for editing, for example in .eps format. This allows additional text, graphic matter and indicia, which may not be available in a music notation editing program, to be added to the colorized score.

The colors may be reproduced either by use of offset printing or by printing using an ink-jet, laserjet, laser, or any other printing method via a conventional personal computer (PC), and through representation in any visual medium, whether analog or digital, in CMYK format or in an RGB or HEX equivalent or any other format that has the appearance of any of the listed colors (within the indicated tolerances).

The invention also provides a method for applying color to the keys of piano and electronic keyboards by means of an adhesive label, for example an electrostatic label or a paper or plastic sticker, colored according to the color list. Alternatively, a piano or other keyboard instrument may have color directly applied to the keys, either by the manufacturer or by the user.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A method of colorizing music notation comprising a recurring series of seven notes A, B, C, D, E, F, and G each of which in sequence represents a next higher step in the series, comprising the steps of:

a. Scanning a printed black and white musical score;
   b. Saving the scanned file;
   c. Assigning colors to the notes in the scanned score to generate a colorized score, the colors being selected from a list comprising, in CMYK standard format, and with a tolerance of plus or minus ten points in one or more of the C, M, Y or K attributes:

Color 1=0.100.0.0
   Color 2=0.52.100.35
   Color 3=0.0.0.100
   Color 4=13.39.0.0
   Color 5=60.0.100.0
   Color 6=44.95.0.0
   Color 7=100.0.0.0;

the colors being assigned in said order to the sequence of notes in the series such that the next higher note in the series corresponds in an incremental increase in the color number; and d. Outputting the colorized score to a printer or memory device.

2. The method of claim 1 in which the colors are reproduced by a computer comprising a printer.

3. The method of claim 1 comprising, before step d., the additional step of exporting the image of die colorized score to a graphics program for editing.

4. The method of claim 1 in which a note affected by an accidental symbol or the key signature is the same color as the corresponding natural note.

5. The method of claim 4 in which the accidental symbol is black.

6. The method of claim 4 in which the symbols of a key signature are colored according to the color of the natural note that is affects.

7. The method of claim 1 in which the keys of a keyboard instrument have colors corresponding to the colors of the notes associated with said keys.

8. The method of claim 7 in which the colors are applied to the keys by adhesive labels.

9. A colorized music score produced according to the method of claim 1.

10. The method of claim 1 in which the tolerance is within plus or minus five points in one or more of the C, M, Y or K attributes.

11. A method of colorizing music notation comprising a recurring series of seven notes A, B, C, D, E, F, and G each of which in sequence represents a next higher step in the series, comprising the steps of:
 a. inputting data into a music notation editing program, the data corresponding to musical notes, to generate a musical score;
 b. if necessary correcting any errors introduced in saving, reading and/or converting the data;
 c. assigning colors to the notes and to key signature accidental symbols in the score to generate a colorized score, the colors of the key signature accidental symbols being the same as the colors assigned to the corresponding notes;
 the colors being selected from a list comprising, in CMYK standard format, and with a tolerance of plus or minus ten points in one or more of the C, M, Y or K attributes:
 Color 1=0.100.0.0
 Color 2=0.52.100.35
 Color 3=0.0.0.100
 Color 4=13.39.0.0
 Color 5=60.0.100.0
 Color 6=44.95.0.0
 Color 7=100.0.0.0:
 the colors being assigned in said order to the sequence of notes in the series such that the next higher note in the series corresponds to an incremental increase in the color number; and
 d. outputting the colorized score to a printer or memory device.

12. The method of claim 11 comprising, before step d., the additional step of exporting the image of the colorized score to a graphics program for editing.

13. The method of claim 11 in which a note affected by an accidental symbol or the key signature is the same color as the corresponding natural note.

14. The method of claim 13 in which the accidental symbol is black.

15. The method of claim 13 in which the symbols of a key signature are colored according to the color of the natural note that is affects.

16. The method of claim 11 in which the keys of a keyboard instrument have colors corresponding to the colors of the notes associated with said keys.

17. The method of claim 16 in which the colon are applied to the keys by adhesive labels.

18. A colorized music score produced according to the method of claim 11.

19. The colorized music score of claim 18 in which colors are also assigned to key signature symbols, the colors of the key signature symbols being the same as the colors assigned to the corresponding notes.

20. The method of claim 11 in which the tolerance is within plus or minus five points in one or more of the C. M, Y or K attributes.

21. A colorized music Score comprising notes representing musical tones comprising a recurring series of seven notes A, B, C, D, B, F, and G each of which in sequence represents a next higher step in the series, each note being colored, the note colors being selected from a list comprising, in CMYK standard format, and with a tolerance of plus or minus ten points in one or more of the C, M, Y or K attributes:
 Color 1=0.100.0.0
 Color 2=0.52.100.35
 Color 3=0.0.0.100
 Color 4=13.39.0.0
 Color 5=60.0.100.0
 Color 6=49.95.0.0
 Color 7=100.0.0.0;
 the colors being assigned in said order to the sequence of notes in the series such that the next higher note in the series corresponds to an incremental increase in the color number.

* * * * *